United States Patent
Okano et al.

(10) Patent No.: US 8,470,194 B2
(45) Date of Patent: Jun. 25, 2013

(54) NI—ZN—CU FERRITE PARTICLES, GREEN SHEET COMPRISING THE NI—ZN—CU FERRITE PARTICLES AND NI—ZN—CU FERRITE SINTERED CERAMICS

(75) Inventors: Yoji Okano, Hiroshima-ken (JP); Tomohiro Dote, Hiroshima-ken (JP); Norio Sugita, Hiroshima-ken (JP)

(73) Assignee: Toda Kogyo Corporation, Otake-shi, Hiroshima-ken (JP)

( * ) Notice: Subject to any disclaimer, the term of this patent is extended or adjusted under 35 U.S.C. 154(b) by 638 days.

(21) Appl. No.: 12/597,222

(22) PCT Filed: Apr. 22, 2008

(86) PCT No.: PCT/JP2008/001046
§ 371 (c)(1),
(2), (4) Date: Feb. 17, 2010

(87) PCT Pub. No.: WO2008/132834
PCT Pub. Date: Nov. 6, 2008

(65) Prior Publication Data
US 2010/0163779 A1  Jul. 1, 2010

(30) Foreign Application Priority Data
Apr. 24, 2007  (JP) .................. 2007-114203

(51) Int. Cl.
*H01F 1/34* (2006.01)
*C04B 35/30* (2006.01)

(52) U.S. Cl.
USPC ................ 252/62.62; 252/62.6; 252/62.59; 252/62.54; 252/62.53

(58) Field of Classification Search
USPC .................. 252/62.62, 62.6, 62.59
See application file for complete search history.

(56) References Cited

FOREIGN PATENT DOCUMENTS

| | | |
|---|---|---|
| JP | 02137301 | 5/1990 |
| JP | A-02-137301 | 5/1990 |
| JP | A-11-273979 | 10/1999 |
| JP | 2004172396 | 6/2004 |
| JP | 2004-296865 | * 10/2004 |
| JP | A-2005-145781 | 6/2005 |
| JP | 2006151702 | 6/2006 |
| JP | 2007-145703 | * 6/2007 |

OTHER PUBLICATIONS

Translation for JP 2007-145703.*
Extended European Search Report in EP 08 75 1590 dated Mar. 22, 2012.
Kumagai et al, "Stress-Insensitive Ferrite for Microinductors", Crystal Properties and Preparation 1989 Fifth International Conference on Ferrites, Jan. 10-13, 1989, Bombay, vol. 27-30, Jan. 1, 1989, pp. 625-630, XP008149705.
International Search Report for PCT/JP2008/001046, mailed May 27, 2008.
Official Action and English translation in JP2008-113137 mailed May 16, 2012.
Official Action and English translation in JP2008-113137 mailed Aug. 8, 2012.

* cited by examiner

*Primary Examiner* — Carol M Koslow
(74) *Attorney, Agent, or Firm* — Nixon & Vanderhye P.C.

(57) ABSTRACT

A Ni—Zn—Cu ferrite material having excellent DC bias characteristics is provided by adding zinc silicate thereto. The above problem can be solved by Ni—Zn—Cu ferrite particles which comprise a spinel-type ferrite and zinc silicate, which have a composition comprising 36.0 to 48.5 mol % of $Fe_2O_3$, 7.0 to 38 mol % of NiO, 4.5 to 40 mol % of ZnO, 5.0 to 17 mol % of CuO and 1.0 to 8.0 mol % of $SiO_2$, all amounts being calculated in terms of the respective oxides, and which have a ratio of an X-ray diffraction intensity from a 113 plane of the zinc silicate to an X-ray diffraction intensity from a 311 plane of the spinel-type ferrite is 0.01 to 0.12; a green sheet obtained by forming a material comprising the Ni—Zn—Cu ferrite particles into a film; and a Ni—Zn—Cu ferrite sintered ceramics.

3 Claims, No Drawings

NI—ZN—CU FERRITE PARTICLES, GREEN SHEET COMPRISING THE NI—ZN—CU FERRITE PARTICLES AND NI—ZN—CU FERRITE SINTERED CERAMICS

This application is the U.S. national phase of International Application No. PCT/JP2008/001046 filed 22 Apr. 2008, which designated the U.S. and claims priority to JP Application No. 2007-114203 filed 24 Apr. 2007, the entire contents of each of which are hereby incorporated by reference.

TECHNICAL FIELD

The present invention relates to Ni—Zn—Cu ferrite particles, and more particularly to a Ni—Zn—Cu ferrite material which is excellent in DC (direct current) bias characteristics by adding zinc silicate thereto.

BACKGROUND ART

In recent years, with respect to electronic equipments such as mobile equipments and information equipments, there is a rapid demand for reduction in size and higher performance. With this tendency, it has also been required to reduce a size of parts used in these equipments such as inductance devices and impart a high performance thereto. In particular, inductance devices used in power source circuits have been required to minimize the deterioration in inductance and the increase in core loss as DC bias characteristics observed when flowing AC current and DC current therethrough in a superimposed manner.

Conventionally, the DC bias characteristics of inductance devices have been improved by providing a structural magnetic gap inside thereof using Mn—Zn ferrite or Ni—Zn ferrite as a material thereof. Also, the core loss of the inductance devices has been reduced by controlling the composition of ferrite or adding additives thereto.

In particular, in the case of a multilayer inductance device which is produced by laminating a ferrite material and a non-magnetic material as a magnetic gap and baking these materials at the same time, there tends to arise such a problem that the resulting inductance device hardly exhibits desired properties owing to poor adhesion between these materials and differences in shrinkage ratio and thermal expansion coefficient therebetween, etc.

To solve the above problem, development of a ferrite material in which excellent DC bias characteristics are imparted to the magnetic material itself without provision of the structural magnetic gap, has proceeded. There are known Ni—Zn or Ni—Zn—Cu ferrite to which silicon oxide and zirconium oxide are added (Patent Document 1 and Patent Document 2), Ni—Zn—Cu ferrite to which silicon is added (Patent Document 3) and the like.

On the other hand, there have been proposed techniques for controlling a change in inductance of Ni—Zn—Cu ferrite owing to change in stress therein by incorporating $Zn_2SiO_4$ into the ferrite (Patent Document 4 and Patent Document 5).

Patent Document 1: Japanese Patent Application Laid-Open (KOKAI) No. 2003-112968
Patent Document 2: Japanese Patent Application Laid-Open (KOKAI) No. 2004-172396
Patent Document 3: Japanese Patent Application Laid-Open (KOKAI) No. 2005-145781
Patent Document 4: Japanese Patent Application Laid-Open (KOKAI) No. 2-137301
Patent Document 2: Japanese Patent Application Laid-Open (KOKAI) No. 2004-296865

DISCLOSURE OF THE INVENTION

Problem to be Solved by the Invention

In the above Patent Documents 1 to 3, it is described that Ni—Zn or Ni—Zn—Cu ferrite is prevented from suffering from deterioration in a permeability thereof when bias DC thereto by incorporating silicon oxide and zirconium oxide into the ferrite. However, in these Patent Documents, no core loss is taken into consideration. Therefore, the techniques described in these Patent Documents are not applicable to production of a ferrite material which is excellent in DC bias characteristics of the magnetic material itself.

Also, in the Patent Documents 4 and 5, there are described the techniques for controlling a change in inductance of Ni—Zn—Cu ferrite owing to change in stress therein. However, in these Patent Documents, no DC bias characteristics are taken into consideration. Therefore, the techniques described in these Patent Documents are not applicable to production of a ferrite material which is excellent in DC bias characteristics of the magnetic material itself.

In consequence, an object of the present invention is to provide a ferrite material which is excellent in DC bias characteristics of the magnetic material itself.

Means for Solving the Problem

The above object can be achieved by the following aspects of the present invention.

That is, according to the present invention, there are provided Ni—Zn—Cu ferrite particles which comprises a spinel-type ferrite and zinc silicate, which has a composition comprising 36.0 to 48.5 mol % of $Fe_2O_3$, 7.0 to 38 mol % of NiO, 4.5 to 40 mol % of ZnO, 5.0 to 17 mol % of CuO and 1.0 to 8.0 mol % of $SiO_2$, all amounts being calculated in terms of the respective oxides, and which has a ratio of an X-ray diffraction intensity from a 113 plane of the zinc silicate to an X-ray diffraction intensity from a 311 plane of the spinel-type ferrite is 0.01 to 0.12 (Invention 1).

Also, according to the present invention, there is provided a green sheet comprising the Ni—Zn—Cu ferrite particles as described in Invention 1, and a binder material (Invention 2).

Further, according to the present invention, there is provided a Ni—Zn—Cu ferrite sintered ceramics which comprises a spinel-type ferrite and zinc silicate, which has a composition comprising 36.0 to 48.5 mol % of $Fe_2O_3$, 7.0 to 38 mol % of NiO, 4.5 to 40 mol % of ZnO, 5.0 to 17 mol % of CuO and 1.0 to 8.0 mol % of $SiO_2$, all amounts being calculated in terms of the respective oxides, and which has a ratio of an X-ray diffraction intensity from a 113 plane of the zinc silicate to an X-ray diffraction intensity from a 311 plane of the spinel-type ferrite is 0.005 to 0.065 (Invention 3).

In addition, according to the present invention, there is provided a Ni—Zn—Cu ferrite sintered ceramics as described in Invention 3, wherein the Ni—Zn—Cu ferrite sintered ceramics has a sintered density of 4.9 to 5.25 g/cm³; a real part $\mu_0'$ of a permeability of the Ni—Zn—Cu ferrite sintered ceramics as measured under the condition that no DC bias magnetic field is applied thereto is in the range of 20 to 170; a core loss $P_0$ of the Ni—Zn—Cu ferrite sintered ceramics as measured under the condition that no DC bias magnetic field is applied thereto is not more than 1400 kW/m³; a ratio of a real part $\mu_{1000}'$ of a permeability of the Ni—Zn—Cu ferrite sintered ceramics as measured under the condition that a DC bias magnetic field of 1000 A/m is applied thereto to the real part $\mu_0'$ ($\mu_{1000}'/\mu_0'$) is not less than 0.5; and a ratio of a core loss $P_{1000}$ of the Ni—Zn—Cu ferrite sintered ceramics as measured under the condition that a DC bias magnetic field of 1000 A/m is applied thereto to the core loss $P_0$ ($P_{1000}/P_0$) is 0.7 to 2.0 (Invention 4).

Effect of the Invention

Since the sintered ceramics obtained by sintering the Ni—Zn—Cu ferrite particles of the present invention is excellent in DC bias characteristics, the Ni—Zn—Cu ferrite particles are suitable as ferrite particles for inductance devices.

Since the sintered ceramics obtained by sintering the green sheet of the present invention is excellent in DC bias characteristics, the green sheet is suitable as a green sheet for inductance devices.

The Ni—Zn—Cu ferrite sintered ceramics according to the present invention is excellent in DC bias characteristics and, therefore, suitable as a ferrite sintered ceramics for inductance devices.

PREFERRED EMBODIMENT FOR CARRYING OUT THE INVENTION

The present invention is described in detail below.

In the present invention, as an index for the DC bias characteristics, there is used the ratio ($\mu_{1000}'/\mu_0'$) of a real part $\mu_{1000}'$ of a permeability of a ferrite sintered ceramics as measured under the condition that a DC bias magnetic field of 1000 A/m is applied thereto to a real part $\mu_0'$ of a permeability of the ferrite sintered ceramics as measured under the condition that no DC bias magnetic field is applied thereto. The ratio $\mu_{1000}'/\mu_0'$ indicates a degree of deterioration in permeability of the ferrite sintered ceramics when applying a DC bias magnetic field of 1000 A/m thereto on the basis of the permeability of the ferrite sintered ceramics when applying a DC bias magnetic field of 0 A/m thereto. The value of the ratio $\mu_{1000}'/\mu_0'$ is usually not more than 1. As the value of the ratio $\mu_{1000}'/\mu_0'$ becomes closer to 1, the real part of a permeability of the ferrite sintered ceramics is more unlikely to be decreased even when applying a DC bias magnetic field thereto. This indicates that such a material is excellent in DC bias characteristics as properties of the magnetic material itself.

Further, in the present invention, as an index for the DC bias characteristics, there is used the ratio ($P_{1000}/P_0$) of a core loss $P_{1000}$ of a ferrite sintered ceramics as measured under the condition that a DC bias magnetic field of 1000 A/m is applied thereto to a core loss $P_0$ of the ferrite sintered ceramics as measured under the condition that no DC bias magnetic field is applied thereto. The ratio $P_{1000}/P_0$ indicates a degree of change in core loss of the ferrite sintered ceramics when applying a DC bias magnetic field of 1000 A/m thereto on the basis of the core loss of the ferrite sintered ceramics when applying a DC bias magnetic field of 0 A/m thereto. When the value of the ratio $P_{1000}/P_0$ is more than 1, the core loss of the ferrite sintered ceramics tends to be increased when applying a DC bias magnetic field thereto.

First, the Ni—Zn—Cu ferrite particles according to the present invention are described.

The Ni—Zn—Cu ferrite particles according to the present invention comprise a spinel-type ferrite and zinc silicate. The Ni—Zn—Cu ferrite particles have a composition comprising 36.0 to 48.5 mol % of $Fe_2O_3$, 7.0 to 38 mol % of NiO, 4.5 to 40 mol % of ZnO, 5.0 to 17 mol % of CuO and 1.0 to 8.0 mol % of $SiO_2$, all amounts being calculated in terms of the respective oxides. When subjecting the Ni—Zn—Cu ferrite particles to X-ray diffraction analysis, the ratio of an X-ray diffraction intensity from a 113 plane of the zinc silicate to an X-ray diffraction intensity from a 311 plane of the spinel-type ferrite (113 plane of zinc silicate/311 plane of spinel-type ferrite) is 0.01 to 0.12.

When the content of $Fe_2O_3$ in the composition of the ferrite particles is out of the above-specified range, the ferrite particles tend to be deteriorated in sintering property, resulting in low sintered density of the resulting sintered ceramics. The content of $Fe_2O_3$ is preferably 36.0 to 48.0 mol % and more preferably 37.0 to 47.5 mol %.

When the content of NiO in the composition of the ferrite particles is less than 7.0 mol %, the ratio $\mu_{1000}'/\mu_0'$ of the sintered ceramics obtained from the ferrite particles tends to be lowered, resulting in poor DC bias characteristics. When the content of NiO is more than 38 mol %, the real part $\mu_0'$ of a permeability of the sintered ceramics obtained from the ferrite particles tends to be lowered, so that the resulting inductance device tends to hardly exhibit a large inductance. The content of NiO is preferably 7.0 to 37 mol % and more preferably 8.0 to 37 mol %.

When the content of ZnO in the composition of the ferrite particles is less than 4.5 mol %, the real part $\mu_0'$ of a permeability of the sintered ceramics obtained from the ferrite particles tends to be lowered, so that the resulting inductance device tends to hardly exhibit a large inductance. When the content of ZnO is more than 40 mol %, the ratio $\mu_{1000}'/\mu_0'$ of the sintered ceramics obtained from the ferrite particles tends to be lowered, resulting in poor DC bias characteristics. The content of ZnO is preferably 5.0 to 39 mol %.

When the content of CuO in the composition of the ferrite particles is less than 5.0 mol %, the ferrite particles tend to be deteriorated in sintering property, resulting in a low sintered density of the resulting sintered ceramics. When the content of CuO is more than 17 mol %, the obtained sintered ceramics tends to be deformed, so that it may be difficult to obtain a sintered ceramics having a desired shape. The content of CuO is preferably 6.0 to 17 mol % and more preferably 6.0 to 16 mol %.

When the content of $SiO_2$ in the composition of the ferrite particles is less than 1.0 mol %, the ratio $\mu_{1000}'/\mu_0'$ of the sintered ceramics obtained from the ferrite particles tends to be lowered, resulting in poor DC bias characteristics. When the content of $SiO_2$ is more than 8.0 mol %, the ferrite particles tend to be deteriorated in sintering property, resulting in a low sintered density of the resulting sintered ceramics. The content of $SiO_2$ is preferably 1.0 to 7.0 mol %.

The Ni—Zn—Cu ferrite particles of the present invention which have a composition comprising 36 to 48 mol % of $Fe_2O_3$, 7.0 to 25.5 mol % of NiO, 16 to 36 mold of ZnO, 7.0 to 17 mol % of CuO and 1.0 to 8.0 mol % of $SiO_2$, can be sintered at a temperature of not more than 950° C., i.e., can be subjected to so-called low-temperature sintering. As a result, since the ferrite particles can be sintered together with Ag, etc., at the same time, it is possible to simply form a circuit in the resulting sintered ceramics.

When the ratio of an X-ray diffraction intensity from a 113 plane of the zinc silicate to an X-ray diffraction intensity from a 311 plane of the spinel-type ferrite is less than 0.01, the ratio $\mu_{1000}'/\mu_0'$ of the sintered ceramics obtained from the ferrite particles tends to be lowered, resulting in poor DC bias characteristics. When the ratio of an X-ray diffraction intensity from a 113 plane of the zinc silicate to an X-ray diffraction intensity from a 311 plane of the spinel-type ferrite is more than 0.120, the ferrite particles tend to be deteriorated in sintering property, resulting in a low sintered density of the resulting sintered ceramics. The ratio of an X-ray diffraction intensity from a 113 plane of the zinc silicate to an X-ray diffraction intensity from a 311 plane of the spinel-type ferrite is preferably 0.01 to 0.115.

As the method for controlling the the ratio of an X-ray diffraction intensity from a 113 plane of the zinc silicate to an X-ray diffraction intensity from a 311 plane of the spinel-type ferrite (113 plane of zinc silicate/311 plane of spinel-type ferrite) to the range of 0.01 to 0.120, there may be used, for example, the method of adding 2 to 15% by weight of the below-mentioned zinc silicate to the previously prepared ferrite particles.

The zinc silicate preferably has a composition comprising 55 to 70 mol % of ZnO and 30 to 45 mol % of $SiO_2$. When the composition of the zinc silicate is out of the above-specified range, the resulting ferrite particles tend to be deteriorated in sintering property, resulting in a low sintered density of the sintered ceramics obtained from the ferrite particles. The zinc silicate more preferably has a composition comprising 60 to 67 mol % of ZnO and 33 to 40 mol % of $SiO_2$. In addition, although the stoichiometric composition of zinc silicate is such a composition comprising 66.7 mol % of ZnO and 33.3 mol % of $SiO_2$, the composition of the zinc silicate may be deviated from the stoichiometric composition so that Zno or $SiO_2$ may be mixed in the zinc silicate.

The zinc silicate preferably has an average particle diameter of 0.1 to 30 μm. When the average particle diameter of the zinc silicate is out of the above-specified range, the resulting ferrite particles tend to be deteriorated in sintering property, resulting in a low sintered density of the sintered ceramics obtained from the ferrite particles. The average particle diameter of the zinc silicate is preferably 0.2 to 20 μm.

The Ni—Zn—Cu ferrite particles of the present invention preferably have a BET specific surface area of 4 to 12 $m^2/g$. When the BET specific surface area is less than 4 $m^2/g$, the resulting ferrite particles tend to be deteriorated in sintering property, resulting in a low sintered density of the sintered ceramics obtained from the ferrite particles. When the BET specific surface area is more than 12 $m^2/g$, the resulting ferrite particles may fail to be uniformly dispersed in a solvent during the production process of the below-mentioned green sheet. The BET specific surface area of the ferrite particles is preferably 6 to 11 $m^2/g$.

The Ni—Zn—Cu ferrite particles of the present invention may be obtained according to an ordinary method, i.e., by pre-calcining a raw material mixture prepared by mixing raw materials such as an oxide, a carbonate, a hydroxide, an oxalate, etc., of respective elements of the ferrite with each other in an atmospheric air in a temperature range of 650 to 900° C. for 1 to 20 hr, and then pulverizing the pre-calcined product to which the zinc silicate produced by the below-mentioned method is added. Alternatively, the Ni—Zn—Cu ferrite particles may be obtained by pulverizing the pre-calcined product solely, and then mixing the resulting particles with the zinc silicate produced by the below-mentioned method.

The zinc silicate used in the present invention may be produced by calcining a raw material mixture prepared by mixing raw materials such as an oxide, a carbonate, a hydroxide, an oxalate, etc., of silicon and zinc with each other, in an atmospheric air in a temperature range of 1000 to 1300° C. for 1 to 20 hr.

Next, the green sheet of the present invention is described.

The green sheet as used herein means a sheet obtained by mixing the above Ni—Zn—Cu ferrite particles with a binder material, a plasticizer and a solvent, etc., to prepare a coating material, applying the resulting coating material to form a coating film having a thickness of from several μm to several hundreds μm using a doctor blade-type coater, etc., and then drying the resulting coating film. The thus obtained sheets are stacked together, and compression-bonded to each other to form a laminate, and then the resulting laminate is sintered at a desired temperature, thereby enabling production of an electronic part such as an inductance device.

The green sheet of the present invention comprises 100 parts by weight of the Ni—Zn—Cu ferrite particles of the present invention, 2 to 20 parts by weight of the binder and 0.5 to 15 parts by weight of the plasticizer. The green sheet preferably comprises 4 to 15 parts by weight of the binder and 1 to 10 parts by weight of the plasticizer based on 100 parts by weight of the ferrite particles. In addition, the solvent may remain in the green sheet owing to insufficient drying after forming the film. Further, known additives such as a viscosity modifier may be added to the green sheet, if required.

Examples of the binder include polyvinyl butyral, polyacrylic acid esters, polymethyl methacrylate, vinyl chloride, polymethacrylic acid esters, ethylene cellulose and abietic acid resins. Among these binders, polyvinyl butyral is preferred.

When the content of the binder material is less than 2 parts by weight, the resulting green sheet tends to become brittle. However, it is not required to use the binder material in an amount of more than 20 parts by weight in order to ensure a strength of the green sheet.

Examples of the plasticizer include benzyl-n-butyl phthalate, butyl butylphthalylglycolate, dibutyl phthalate, dimethyl phthalate, polyethylene glycol, a phthalic acid ester, butyl stearate and methyl adipate.

When the content of the plasticizer is less than 0.5 part by weight, the resulting green sheet tends to be too hard, resulting in occurrence of cracks. When the content of the plasticizer is more than 15 parts by weight, the resulting green sheet tends to be too soft, resulting in poor handling property.

Upon production of the green sheet according to the present invention, the solvent is used in an amount of 15 to 150 parts by weight based on 100 parts by weight of the Ni—Zn—Cu ferrite particles. When the amount of the solvent used is out of the above-specified range, it is not possible to obtain a uniform green sheet, so that an inductance device obtained by sintering the green sheet tends to be fluctuated in properties.

Examples of the solvent include acetone, benzene, butanol, ethanol, methyl ethyl ketone, toluene, propyl alcohol, isopropyl alcohol, nu-butyl acetate and 3-methyl-3-methoxy-1-butanol.

The pressure used for forming a laminate of the green sheet is preferably $0.2 \times 10^4$ to $0.6 \times 10^4$ $t/m^2$.

Next, the Ni—Zn—Cu ferrite sintered ceramics of the present invention is described.

The Ni—Zn—Cu ferrite sintered ceramics of the present invention comprises a spinel-type ferrite and zinc silicate and has a composition comprising 36 to 48.5 mol % of $Fe_2O_3$, 7 to 38 mol % of NiO, 4.5 to 40 mol % of ZnO, 5 to 17 mol % of CuO and 1 to 8 mol % of $SiO_2$, all amounts being calculated in terms of the respective oxides. The ratio of an X-ray diffraction intensity from a 113 plane of the zinc silicate to an X-ray diffraction intensity from a 311 plane of the spinel-type ferrite is 0.005 to 0.065.

When the content of $Fe_2O_3$ in the composition of the sintered ceramics is out of the above-specified range, the sintered density of the resulting sintered ceramics tends to be lowered. The content of $Fe_2O_3$ is preferably 37 to 47.5 mol %.

When the content of NiO in the composition of the sintered ceramics is less than 7 mol %, the ratio $\mu_{1000}'/\mu_0'$ of the sintered ceramics tends to be lowered, resulting in poor DC bias characteristics. When the content of NiO is more than 38 mol %, the real part $\mu_0'$ of a permeability of the sintered ceramics tends to be lowered, so that the resulting inductance device tends to hardly exhibit a large inductance. The content of NiO is preferably 8 to 37 mol %.

When the content of ZnO in the composition of the sintered ceramics is less than 4.5 mol %, the real part $\mu_0'$ of a permeability of the sintered ceramics tends to be lowered, so that the resulting inductance device tends to hardly exhibit a large inductance. When the content of ZnO is more than 40 mol %, the ratio $\mu_{1000}'/\mu_0'$ of the sintered ceramics tends to be lowered, resulting in poor DC bias characteristics. The content of ZnO is preferably 5 to 39 mol %.

When the content of CuO in the composition of the sintered ceramics is less than 5.0 mol %, the sintered density of the resulting sintered ceramics tends to be lowered. When the content of CuO is more than 17 mol %, the obtained sintered ceramics tends to be deformed, so that it may be difficult to obtain a sintered ceramics having a desired shape. The content of CuO is preferably 6 to 16 mol %.

When the content of $SiO_2$ in the composition of the sintered ceramics is less than 1 mol %, the ratio $\mu_{1000}'/\mu_0'$ of the sintered ceramics tends to be lowered, resulting in poor DC bias characteristics. When the content of $SiO_2$ is more than 8 mol %, the sintered density of the resulting sintered ceramics tends to be lowered. The content of $SiO_2$ is preferably 1 to 7 mol %.

The Ni—Zn—Cu ferrite sintered ceramics of the present invention which has a composition comprising 36 to 48 mol % of $Fe_2O_3$, 7 to 25.5 mol % of NiO, 16 to 36 mol % of ZnO, 7 to 17 mol % of CuO and 1 to 8 mol % of $SiO_2$, can be sintered at a temperature of not more than 950° C., i.e., can be subjected to so-called low-temperature sintering. As a result, it is possible to simply form a circuit in the sintered ceramics by simultaneously sintering the ferrite particles together with Ag, etc.

When the ratio of an X-ray diffraction intensity from a 113 plane of the zinc silicate to an X-ray diffraction intensity from a 311 plane of the spinel-type ferrite is tends to be lowered, resulting in poor DC bias characteristics. When the ratio of an X-ray diffraction intensity from a 113 plane of the zinc silicate to an X-ray diffraction intensity from a 311 plane of the spinel-type ferrite is more than 0.065, the sintered density of the sintering ceramics tends to be lowered. The ratio of an X-ray diffraction intensity from a 113 plane of the zinc silicate to an X-ray diffraction intensity from a 311 plane of the spinel-type ferrite is preferably 0.005 to 0.06. Meanwhile, As an example of the method for controlling the X-ray diffraction intensity ratio to the above-specified range, there may be used the method described previously.

The sintered density of the Ni—Zn—Cu ferrite sintered ceramics according to the present invention is 4.9 to 5.25 g/cm³. When the sintered density is less than 4.9 g/cm³, the resulting sintered ceramics tends to be deteriorated in mechanical strength, resulting in risk of breakage upon use. The sintered density of the Ni—Zn—Cu ferrite sintered ceramics is preferably as high as possible. However, the upper limit of the sintered density of the sintered ceramics obtained in the present invention is 5.25 g/cm³. The sintered density of the sintered ceramics is preferably 4.95 to 5.2 g/cm³.

The real part $\mu_0'$ of a permeability of the Ni—Zn—Cu ferrite sintered ceramics according to the present invention is 20 to 170. When the real part $\mu_0'$ of a permeability of the sintered ceramics is less than 20, the inductance device obtained from the sintered ceramics tends to hardly exhibit a large inductance. When the real part $\mu_0'$ of a permeability of the sintered ceramics is more than 170, the resulting sintered ceramics tends to be deteriorated in DC bias characteristics. The real part $\mu_0'$ of a permeability of the sintered ceramics is preferably 30 to 160.

The ratio $\mu_{1000}'/\mu_0'$ of the Ni—Zn—Cu ferrite sintered ceramics according to the present invention is not less than 0.5. When the ratio $\mu_{1000}'/\mu_0'$ is less than 0.5, the inductance device obtained from the sintered ceramics tends to be deteriorated in DC bias characteristics. The upper limit of the ratio $\mu_{1000}'/\mu_0'$ of the sintered ceramics is 1.0.

The core loss $P_0$ of the Ni—Zn—Cu ferrite sintered ceramics according to the present invention is not more than 1400 kW/m³. When the core loss $P_0$ is more than 1400 kW/m³, the loss as the sintered ceramics tends to be increased, so that the inductance device obtained from the sintered ceramics tends to have a poor efficiency. The core loss $P_0$ of the sintered ceramics is preferably not more than 1300 kW/m³, more preferably not more than 1200 kW/m³ and still more preferably not more than 1000 kW/m³. The lower limit of the core loss $P_0$ of the sintered ceramics is about 100 kW/m³.

The ratio $P_{1000}/P_0$ of the Ni—Zn—Cu ferrite sintered ceramics according to the present invention is 0.7 to 2.0. When the ratio $P_{1000}/P_0$ is out of the above-specified range, the resulting sintered ceramics tends to be deteriorated in DC bias characteristics. The ratio $P_{1000}/P_0$ of the sintered ceramics is preferably 0.8 to 1.9.

The Ni—Zn—Cu ferrite sintered ceramics according to the present invention may be produced by sintering a molded product obtained by pressure-molding the Ni—Zn—Cu ferrite particles of the present invention under a pressure of 0.3 to $3.0 \times 10^4$ t/m² using a metal mold, i.e., by a so-called powder press-molding method, or a laminate obtained by laminating the green sheets each comprising the Ni—Zn—Cu ferrite particles of the present invention, i.e., by a so-called green sheet method, at a temperature of 880 to 1050° C. for 1 to 20 hr, preferably 1 to 10 hr. As the molding method, there may be used any known methods, but the above-mentioned powder press-molding method or green sheet method is preferred.

When the sintering temperature is less than 880° C., the resulting sintered ceramics tends to be deteriorated in mechanical strength owing to low sintered density thereof. When the sintering temperature is more than 1050° C., the resulting sintered ceramics tends to be deformed, so that it may be difficult to obtain a sintered ceramics having a desired shape.

<Function>

The most important point of the present invention resides in that the Ni—Zn—Cu ferrite sintered ceramics obtained by sintering the Ni—Zn—Cu ferrite particles comprising a spinel-type ferrite and zinc silicate and having such a composition in which contents of $Fe_2O_3$, NiO, ZnO, CuO and $SiO_2$ lie within the respective specific ranges, is excellent in DC bias characteristics of the magnetic material itself. The reason why the DC bias characteristics of the sintered ceramics are enhanced, is considered by the present inventors as follows, although it is not clearly determined. That is, it is considered that zinc silicate is present at a grain boundary of the Ni—Zn—Cu ferrite having the specific ferrite composition, so that the magnetization curve of the Ni—Zn—Cu ferrite sintered ceramics has a moderate inclination and shows a linear change.

EXAMPLES

Typical embodiments of the present invention are as follows.

The compositions of the Ni—Zn—Cu ferrite particles and the Ni—Zn—Cu ferrite sintered ceramics were measured using a fluorescent X-ray analyzer "RIX2100" manufactured by Rigaku Denki Kogyo Co., Ltd.

The crystal phase forming the Ni—Zn—Cu ferrite particles and the Ni—Zn—Cu ferrite sintered ceramics as well as the ratio of an X-ray diffraction intensity from a 113 plane of the zinc silicate to an X-ray diffraction intensity from a 311 plane of the spinel-type ferrite were measured using an X-ray diffraction apparatus "RINT 2500" manufactured by Rigaku Denki Kogyo Co., Ltd.

The BET specific surface area was measured using "MONOSORB MS-21" manufactured by Yuasa Ionix Co., Ltd.

The sintered density of the Ni—Zn—Cu ferrite sintered ceramics was calculated from a volume and a weight of a sample which were measured from an outer diameter thereof.

The permeability $\mu_0'$ of the Ni—Zn—Cu ferrite sintered ceramics was determined as follows. That is, a permeability of a ring-shaped sintered ceramics around which a coil was wound was measured at a frequency of 1 MHz and a magnetic flux density of 25 mT using a B-H/Z analyzer "E5060A" manufactured by Agerent Technology Co., Ltd., under the condition that no DC bias magnetic field was applied thereto, and a real part of the thus measured permeability was determined as $\mu_0'$.

The permeability $\mu_{1000}'$ of the Ni—Zn—Cu ferrite sintered ceramics was determined as follows. That is, a permeability of a ring-shaped sintered ceramics around which a coil was wound was measured at a frequency of 1 MHz and a magnetic flux density of 25 mT using a B-H/Z analyzer "E5060A" manufactured by Agerent Technology Co., Ltd., under the condition that a DC bias magnetic field of 1000 A/m was applied thereto, and a real part of the thus measured permeability was determined as $\mu_{1000}'$. The ratio $\mu_{1000}'/\mu_0'$ was calculated from $\mu_0'$ and $\mu_{1000}'$ thus measured.

The core loss $P_0$ of the Ni—Zn—Cu ferrite sintered ceramics was determined as follows. That is, a $P_{cv}$ value of a ring-shaped sintered ceramics around which a coil was wound was measured at a frequency of 1 MHz and a magnetic flux density of 25 mT using a B-H/Z analyzer "E5060A" manufactured by Agerent Technology Co., Ltd., under the condition that no DC bias magnetic field was applied thereto, and the thus measured $P_{cv}$ value was determined as $P_0$.

The core loss $P_{1000}$ of the Ni—Zn—Cu ferrite sintered ceramics was determined as follows. That is, a $P_{cv}$ value of a ring-shaped sintered ceramics around which a coil was wound was measured at a frequency of 1 MHz and a magnetic flux density of 25 mT using a B-H/Z analyzer "E5060A" manufactured by Agerent Technology Co., Ltd., under the condition that a DC bias magnetic field of 1000 A/m was applied thereto, and the thus measured $P_{cv}$ value was determined as $P_{1000}$. The ratio $P_{1000}/P_0$ was calculated from $P_0$ and $P_{1000}$ thus measured.

Example 1

<Production of Ni—Zn—Cu Ferrite Particles>

The respective oxide raw materials were weighed such that Ni—Zn—Cu ferrite obtained therefrom had a predetermined composition, and wet-mixed with each other for 20 hr using a ball mill. The resulting mixed slurry was filtered to separate a solid component therefrom, and the thus separated solid component was dried to obtain raw mixed particles. The thus obtained raw mixed particles were pre-calcined at 720° C. for 4 hr, and the resulting pre-calcined product was pulverized using an atomizer, thereby obtaining pulverized ferrite particles.

Separately, zinc oxide and silicon oxide were weighed such that zinc silicate obtained therefrom had a predetermined composition, and wet-mixed with each other for 20 hr using a ball mill. The resulting mixed slurry was filtered to separate a solid component therefrom, and the thus separated solid component was dried and then calcined at 1200° C. for 3 hr, thereby obtaining zinc silicate. The thus obtained zinc silicate had a composition comprising 66.5 mol % of ZnO and 33.5 mol % of $SiO_2$, and an average particle diameter of 5.2 μm.

Next, 2% by weight of the zinc silicate was added to and mixed with the pulverized ferrite particles such that the resulting mixture had a predetermined composition, and then the mixture was mixed and pulverized using a ball mill, thereby obtaining the Ni—Zn—Cu ferrite particles according to the present invention.

The thus obtained Ni—Zn—Cu ferrite particles had a composition comprising 47.5 mol % of $Fe_2O_3$, 14.0 mol % of NiO, 27.0 mol % of ZnO, 10.5 mol % of CuO and 1.0 mol % of $SiO_2$. The ratio of an X-ray diffraction intensity from a 113 plane of zinc silicate to an X-ray diffraction intensity from a 311 plane of spinel-type ferrite in the Ni—Zn—Cu ferrite particles was 0.010. Also, the BET specific surface area of the Ni—Zn—Cu ferrite particles was 8.8 m²/g.

<Production of Green Sheet>

Eight parts by weight of polyvinyl butyral as a binder material, 3 parts by weight of benzyl-n-butyl phthalate as a plasticizer and 50 parts by weight of 3-methyl-3-methoxy-1-butanol as a solvent were added to 100 parts by weight of the thus obtained Ni—Zn—Cu ferrite particles, and the resulting mixture was fully mixed to obtain a slurry. The thus obtained slurry was applied onto a PET film using a doctor blade-type coater to form a coating film thereon. The coating film was then dried to obtain a green sheet having a thickness of 73 μm. The thus obtained eight green sheets each cut into a size of 100 mm in length×100 mm in width, were stacked and then pressed together under a pressure of 0.35×10⁴ t/m², thereby obtaining a green sheet laminate having a thickness of 0.58 mm.

<Production of Ni—Zn—Cu Ferrite Sintered Ceramics>

The above obtained green sheet laminate was sintered at 890° C. for 2 hr, thereby obtaining a Ni—Zn—Cu ferrite sintered ceramics having a thickness of 0.48 μm. The thus obtained Ni—Zn—Cu ferrite sintered ceramics had a composition comprising 47.5 mol % of $Fe_2O_3$, 14.2 mol % of NiO, 27.1 mol % of ZnO, 10.2 mol % of CuO and 1.0 mol % of $SiO_2$. The ratio of an X-ray diffraction intensity from a 113 plane of zinc silicate to an X-ray diffraction intensity from a 311 plane of spinel-type ferrite in the Ni—Zn—Cu ferrite sintered ceramics was 0.005. Also, the sintered density of the sintered ceramics was 5.01 g/cm³. Further, the Ni—Zn—Cu ferrite sintered ceramics was cut into a ring-shaped sintered ceramics having an outer diameter of 14 mm, an inner diameter of 8 mm and a thickness of 0.48 mm using an ultrasonic machine to measure magnetic properties thereof. As a result, it was confirmed that the sintered ceramics had $\mu_0'$ of 152, a ratio $\mu_{1000}'/\mu_0'$ of 0.50, a core loss $P_0$ of 380 kW/m³ and a ratio $P_{1000}/P_0$ of 1.88.

Examples 2 to 7

Respective Ni—Zn—Cu ferrite sintered ceramics were produced by the same method as defined in Example 1. The production conditions used in these Examples and various properties of the thus obtained Ni—Zn—Cu ferrite sintered ceramics are shown in Tables 1, 2 and 3.

Example 8

The same Ni—Zn—Cu ferrite particles as defined in Example 1 were produced, and 100 parts by weight of the thus obtained Ni—Zn—Cu ferrite particles were mixed with 10 parts by weight of a 6% polyvinyl alcohol aqueous solution to obtain mixed particles. Then, 7.0 g of the thus obtained mixed particles were press-molded in a metal mold under a pressure of $1.0 \times 10^4$ t/m$^2$ to obtain a disk-shaped molded product having an outer diameter of 30 mm and a thickness of 2.9 mm. The thus obtained molded product was sintered at 900° C. for 5 hr, thereby obtaining a Ni—Zn—Cu ferrite sintered ceramics.

The composition, X-ray diffraction intensity ratio and sintered density of the thus obtained Ni—Zn—Cu ferrite sintered ceramics were measured, and then the sintered ceramics was cut into a ring-shaped sintered ceramics having an outer diameter of 14 mm, an inner diameter of 8 mm and a thickness of 2 mm using an ultrasonic machine to measure magnetic properties thereof.

The production conditions used in this Example and various properties of the thus obtained Ni—Zn—Cu ferrite sintered ceramics are shown in Tables 1, 2 and 3.

Examples 9 and 10

Respective Ni—Zn—Cu ferrite sintered ceramics were produced by the same method as defined in Example 8. The production conditions used in these Examples and various properties of the thus obtained Ni—Zn—Cu ferrite sintered ceramics are shown in Tables 1, 2 and 3.

Comparative Examples 1 to 5

Respective Ni—Zn—Cu ferrite sintered ceramics were produced by the same method as defined in Example 1 or 8. The production conditions used in these Comparative Examples and various properties of the thus obtained Ni—Zn—Cu ferrite sintered ceramics are shown in Tables 1, 2 and 3.

Comparative Example 6

The respective oxide raw materials were weighed such that ferrite obtained therefrom had a composition comprising 49.5 mol % of $Fe_2O_3$, 20.7 mol % of NiO, 22.8 mol % of ZnO and 7 mol % of CuO, and wet-mixed with each other for 20 hr using a ball mill. The resulting mixed slurry was filtered to separate a solid component therefrom, and the thus separated solid component was dried to obtain raw mixed particles. The thus obtained raw mixed particles were pre-calcined at 750° C. for 4 hr, and the resulting pre-calcined product was pulverized using an atomizer, thereby obtaining pulverized ferrite particles.

Separately, zinc oxide and silicon oxide were weighed such that zinc silicate obtained therefrom had a composition of $Zn_2SiO_4$, and wet-mixed with each other for 20 hr using a ball mill. The resulting mixed slurry was filtered to separate a solid component therefrom, and the thus separated solid component was dried and then calcined at 1200° C. for 3 hr, thereby obtaining zinc silicate. The thus obtained zinc silicate had a composition comprising 66.7 mol % of ZnO and 33.3 mol % of $SiO_2$, and an average particle diameter of 5.0 μm.

Next, 1.5% by weight of the zinc silicate was added to the pulverized ferrite particles, and then the obtained mixture was mixed and pulverized using a ball mill, thereby obtaining the Ni—Zn—Cu ferrite particles.

The thus obtained Ni—Zn—Cu ferrite particles had a composition comprising 48.4 mol % of $Fe_2O_3$, 20.4 mol % of NiO, 23.6 mol % of ZnO, 6.8 mol % of CuO and 0.8 mol % of $SiO_2$. The ratio of an X-ray diffraction intensity from a 113 plane of zinc silicate to an X-ray diffraction intensity from a 311 plane of spinel-type ferrite in the Ni—Zn—Cu ferrite particles was 0.006. Also, the BET specific surface area of the Ni—Zn—Cu ferrite particles was 7.5 m$^2$/g.

One hundred parts by weight of the thus obtained Ni—Zn—Cu ferrite particles were mixed with 10 parts by weight of a 6% polyvinyl alcohol aqueous solution to obtain mixed particles. Then, 7.0 g of the thus obtained mixed particles were press-molded in a metal mold under a pressure of $1.0 \times 10^4$ t/m$^2$ to obtain a disk-shaped molded product having an outer diameter of 30 mm and a thickness of 2.9 mm. The thus obtained molded product was sintered at 1000° C. for 2 hr, thereby obtaining a Ni—Zn—Cu ferrite sintered ceramics.

The thus obtained Ni—Zn—Cu ferrite sintered ceramics had a composition comprising 48.5 mol % of $Fe_2O_3$, 20.5 mol % of NiO, 23.3 mol % of ZnO, 6.9 mol % of CuO and 0.8 mol % of $SiO_2$. The ratio of an X-ray diffraction intensity from a 113 plane of zinc silicate to an X-ray diffraction intensity from a 311 plane of spinel-type ferrite in the Ni—Zn—Cu ferrite sintered ceramics was 0.003. Also, the sintered density of the sintered ceramics was 5.19 g/cm$^3$. Further, the Ni—Zn—Cu ferrite sintered ceramics was cut into a ring-shaped sintered ceramics having an outer diameter of 14 mm, an inner diameter of 8 mm and a thickness of 2 mm using an ultrasonic machine to measure magnetic properties thereof. As a result, it was confirmed that the sintered ceramics had $\mu_0'$ of 242, a ratio $\mu_{1000}'/\mu_0'$ of 0.28, a core loss $P_0$ of 198 kW/m3 and a ratio $P_{1000}/P_0$ of 2.97.

In Comparative Example 6, since the amount of the zinc silicate added was small relative to that of the spinel-type ferrite, the ratio of an X-ray diffraction intensity from a 113 plane of the zinc silicate to an X-ray diffraction intensity from a 311 plane of the spinel-type ferrite in the Ni—Zn—Cu ferrite particles became small. As a result, the sintered ceramics obtained from the Ni—Zn—Cu ferrite particles failed to exhibit excellent DC bias characteristics.

TABLE 1

| No. | Properties of Ni—Zn—Cu ferrite particles Composition [mol %] | | | | |
|---|---|---|---|---|---|
|  | $Fe_2O_3$ | NiO | ZnO | CuO | $SiO_2$ |
| Example 1 | 47.5 | 14.0 | 27.0 | 10.5 | 1.0 |
| Example 2 | 44.4 | 13.2 | 29.4 | 9.9 | 3.1 |
| Example 3 | 38.2 | 11.0 | 34.5 | 8.5 | 7.8 |
| Example 4 | 46.8 | 8.2 | 36.0 | 7.4 | 1.6 |
| Example 5 | 36.3 | 7.1 | 39.7 | 9.5 | 7.4 |
| Example 6 | 45.4 | 25.4 | 16.4 | 11.8 | 1.0 |
| Example 7 | 44.1 | 35.1 | 8.1 | 9.6 | 3.1 |
| Example 8 | 44.8 | 17.6 | 17.9 | 16.6 | 3.1 |
| Example 9 | 39.4 | 16.1 | 34.8 | 5.3 | 4.4 |
| Example 10 | 48.3 | 37.6 | 4.7 | 8.4 | 1.0 |
| Comparative Example 1 | 43.1 | 6.7 | 40.8 | 8.6 | 0.8 |
| Comparative Example 2 | 48.7 | 38.2 | 4.1 | 7.7 | 1.3 |
| Comparative Example 3 | 35.7 | 18.6 | 24.8 | 13.3 | 7.6 |
| Comparative Example 4 | 45.1 | 11.8 | 35.9 | 4.6 | 2.6 |
| Comparative Example 5 | 35.9 | 15.4 | 23.5 | 17.1 | 8.1 |
| Comparative Example 6 | 48.4 | 20.4 | 23.6 | 6.8 | 0.8 |

| No. | Properties of Ni—Zn—Cu ferrite particles BET specific surface area [m$^2$/g] | X-ray diffraction intensity ratio |
|---|---|---|
| Example 1 | 8.8 | 0.010 |
| Example 2 | 9.5 | 0.038 |

TABLE 1-continued

|  | | |
|---|---|---|
| Example 3 | 11.3 | 0.117 |
| Example 4 | 10.3 | 0.017 |
| Example 5 | 10.8 | 0.112 |
| Example 6 | 9.1 | 0.011 |
| Example 7 | 6.8 | 0.040 |
| Example 8 | 9.0 | 0.037 |
| Example 9 | 5.5 | 0.057 |
| Example 10 | 8.5 | 0.011 |
| Comparative Example 1 | 7.8 | 0.007 |
| Comparative Example 2 | 11.2 | 0.015 |
| Comparative Example 3 | 9.2 | 0.114 |
| Comparative Example 4 | 9.1 | 0.032 |
| Comparative Example 5 | 8.6 | 0.126 |
| Comparative Example 6 | 7.5 | 0.006 |

TABLE 2

Production conditions of Ni—Zn—Cu ferrite sintered ceramics

| No. | Molding method | Sintering temperature [° C.] | Sintering time [hr] |
|---|---|---|---|
| Example 1 | Green sheet method | 890 | 2 |
| Example 2 | Green sheet method | 900 | 2 |
| Example 3 | Green sheet method | 930 | 3 |
| Example 4 | Green sheet method | 900 | 2 |
| Example 5 | Green sheet method | 910 | 3 |
| Example 6 | Green sheet method | 910 | 8 |
| Example 7 | Green sheet method | 980 | 3 |
| Example 8 | Powder press-molding method | 900 | 5 |
| Example 9 | Powder press-molding method | 1030 | 3 |
| Example 10 | Powder press-molding method | 980 | 5 |
| Comparative Example 1 | Green sheet method | 960 | 3 |
| Comparative Example 2 | Green sheet method | 970 | 5 |
| Comparative Example 3 | Green sheet method | 960 | 8 |
| Comparative Example 4 | Powder press-molding method | 920 | 2 |
| Comparative Example 5 | Powder press-molding method | 960 | 4 |
| Comparative Example 6 | Powder press-molding method | 1000 | 2 |

TABLE 3

Properties of Ni—Zn—Cu ferrite sintered ceramics Composition [mol %]

| No. | $Fe_2O_3$ | NiO | ZnO | CuO | $SiO_2$ |
|---|---|---|---|---|---|
| Example 1 | 47.5 | 14.2 | 27.1 | 10.2 | 1.0 |
| Example 2 | 44.4 | 13.3 | 29.4 | 9.7 | 3.2 |
| Example 3 | 38.0 | 11.2 | 34.7 | 8.2 | 7.9 |
| Example 4 | 46.8 | 8.3 | 36.0 | 7.2 | 1.7 |
| Example 5 | 36.1 | 7.1 | 39.8 | 9.6 | 7.4 |
| Example 6 | 45.3 | 25.6 | 16.3 | 11.7 | 1.1 |
| Example 7 | 44.1 | 35.1 | 8.2 | 9.4 | 3.2 |
| Example 8 | 44.9 | 17.4 | 18.0 | 16.7 | 3.0 |
| Example 9 | 39.4 | 16.3 | 34.8 | 5.0 | 4.5 |
| Example 10 | 48.3 | 37.8 | 4.5 | 8.3 | 1.1 |
| Comparative Example 1 | 42.9 | 6.8 | 40.6 | 8.9 | 0.8 |
| Comparative Example 2 | 48.7 | 38.3 | 4.2 | 7.5 | 1.3 |
| Comparative Example 3 | 35.8 | 18.6 | 24.9 | 13.0 | 7.7 |
| Comparative Example 4 | 45.0 | 12.0 | 35.7 | 4.7 | 2.6 |
| Comparative Example 5 | 35.8 | 15.2 | 23.7 | 17.1 | 8.2 |
| Comparative Example 6 | 48.5 | 20.5 | 23.3 | 6.9 | 0.8 |

Properties of Ni—Zn—Cu ferrite sintered ceramics

| No. | X-ray diffraction intensity ratio | Sintered density [g/cm³] |
|---|---|---|
| Example 1 | 0.005 | 5.01 |
| Example 2 | 0.020 | 5.11 |
| Example 3 | 0.065 | 5.04 |
| Example 4 | 0.012 | 5.18 |
| Example 5 | 0.058 | 5.05 |
| Example 6 | 0.007 | 5.14 |
| Example 7 | 0.023 | 5.21 |
| Example 8 | 0.018 | 5.09 |
| Example 9 | 0.031 | 5.24 |
| Example 10 | 0.006 | 5.03 |
| Comparative Example 1 | 0.003 | 5.04 |
| Comparative Example 2 | 0.007 | 5.06 |
| Comparative Example 3 | 0.062 | 5.01 |
| Comparative Example 4 | 0.017 | 4.70 |
| Comparative Example 5 | 0.066 | 4.86 |
| Comparative Example 6 | 0.003 | 5.19 |

Properties of Ni—Zn—Cu ferrite sintered ceramics

| No. | $\mu_0'$ | $P_0$ [kW/m³] | $\mu_{1000}'/\mu_0'$ | $P_{1000}/P_0$ |
|---|---|---|---|---|
| Example 1 | 152 | 380 | 0.50 | 1.88 |
| Example 2 | 71 | 653 | 0.71 | 1.12 |
| Example 3 | 47 | 925 | 0.83 | 0.93 |
| Example 4 | 137 | 471 | 0.52 | 1.51 |
| Example 5 | 61 | 742 | 0.77 | 0.95 |
| Example 6 | 97 | 567 | 0.57 | 1.29 |
| Example 7 | 22 | 1260 | 0.91 | 0.85 |
| Example 8 | 49 | 803 | 0.82 | 0.92 |
| Example 9 | 55 | 788 | 0.79 | 0.94 |
| Example 10 | 40 | 970 | 0.85 | 1.03 |
| Comparative Example 1 | 175 | 263 | 0.38 | 2.50 |
| Comparative Example 2 | 13 | 1627 | 1.03 | 0.71 |
| Comparative Example 3 | 15 | 1610 | 0.96 | 0.69 |
| Comparative Example 4 | 38 | 954 | 0.85 | 0.98 |
| Comparative Example 5 | 18 | 1380 | 0.92 | 0.78 |
| Comparative Example 6 | 242 | 198 | 0.28 | 2.97 |

As apparently recognized from the above Examples, the Ni—Zn—Cu ferrite sintered ceramics comprising a spinel-type ferrite and zinc silicate wherein the sintered ceramics has a composition comprising 36 to 48.5 mol % of $Fe_2O_3$, 7 to 38 mol % of NiO, 4.5 to 40 mol % of ZnO, 5 to 17 mol % of CuO and 1 to 8 mol % of $SiO_2$, all amounts being calculated in terms of the respective oxides, and a ratio of an X-ray diffraction intensity from a 113 plane of the zinc silicate to an X-ray diffraction intensity from a 311 plane of the spinel-type ferrite is 0.005 to 0.065, is excellent in DC bias characteristics of the material itself and, therefore, suitable as a magnetic material for inductance devices.

Also, the Ni—Zn—Cu ferrite particles comprising a spinel-type ferrite and zinc silicate wherein the ferrite particles has a composition comprising 36 to 48.5 mol % of $Fe_2O_3$, 7 to 38 mol % of NiO, 4.5 to 40 mol % of ZnO, 5 to 17 mol % of CuO and 1 to 8 mol % of $SiO_2$, all amounts being calculated in terms of the respective oxides, and a ratio of an X-ray diffraction intensity from a 113 plane of the zinc silicate to an X-ray diffraction intensity from a 311 plane of the spinel-type ferrite is 0.01 to 0.12, are suitable as a magnetic material for inductance devices, because a Ni—Zn—Cu ferrite sintered ceramics obtained by sintering the ferrite particles is excellent in DC bias characteristics of the material itself.

In addition, the green sheet obtained by forming the Ni—Zn—Cu ferrite particles and a binder material into a sheet, is suitable as a magnetic material for inductance devices, because a Ni—Zn—Cu ferrite sintered ceramics obtained by sintering the green sheet is excellent in DC bias characteristics of the material itself.

In the foregoing, although the present invention is explained in detail by Examples, the numeral ranges as defined in the present invention are necessarily intended to involve all of the ranges using the numerals described in any optional one of the above Examples as a critical value unless departing from the scope of the present invention, and it should be construed that all of them are described in the present specification.

The invention claimed is:

1. Particle mixtures comprising zinc silicate particles and Ni—Zn—Cu ferrite particles which comprise a spinel-type ferrite and zinc silicate, which have a composition comprising 36.0 to 48.5 mol % of $Fe_2O_3$, 7.0 to 37 mol % of NiO, 4.5 to 40 mol % of ZnO, 5.0 to 17 mol % of CuO and 1.0 to 8.0 mol % of $SiO_2$, all amounts being calculated in terms of the respective oxides, and which have a ratio of an X-ray diffraction intensity from a 113 plane of the zinc silicate to an X-ray diffraction intensity from a 311 plane of the spinel-type ferrite is 0.01 to 0.12.

2. A mixture of particles as defined in claim 1, and a binder material.

3. A Ni—Zn—Cu ferrite sintered ceramic which comprises a spinel-type ferrite and zinc silicate, which has a composition comprising 36.0 to 48.5 mol % of $Fe_2O_3$, 7.0 to 38 mol % of NiO, 4.5 to 40 mol % of ZnO, 5.0 to 17 mol % of CuO and 1.0 to 8.0 mol % of $SiO_2$, all amounts being calculated in terms of the respective oxides, and which has a ratio of an X-ray diffraction intensity from a 113 plane of the zinc silicate to an X-ray diffraction intensity from a 311 plane of the spinel-type ferrite is 0.005 to 0.065, a sintered density of 4.9 to 5.25 $g/cm^3$; a real part $\mu_0'$ of a permeability of the Ni—Zn—Cu ferrite sintered ceramics as measured under the condition that no DC bias magnetic field is applied thereto is in the range of 20 to 170; a core loss $P_0$ of the Ni—Zn—Cu ferrite sintered ceramics as measured under the condition that no DC bias magnetic field is applied. thereto is not more than 1400 $kW/m^3$; a ratio of a real part $\mu_{1000}'$ of a permeability of the Ni—Zn—Cu ferrite sintered ceramics as measured under the condition that a DC bias magnetic field of 1000 A/m is applied thereto to the real part $\mu_0'$ ($\mu_{1000}'/\mu_0'$) is not less than 0.5; and a ratio of a core loss $P_{1000}$ of the Ni—Zn—Cu ferrite sintered ceramics as measured and the condition that a DC bias magnetic field of 1000 A/m is applied thereto to the core loss $P_0$ ($P_{1000}/P_0$) is 0.7 to 2.0.

* * * * *